United States Patent [19]
Manoussos et al.

[11] 3,887,703
[45] June 3, 1975

[54] MUCOPOLYSACCHARIDES, THEIR PREPARATION AND USE IN COSMETIC AND PHARMACEUTICAL COMPOSITIONS

[75] Inventors: Georges Manoussos; Claudine Berrebi, both of Paris, France

[73] Assignee: Societe Anonyne dite: L'Oreal, Paris, France

[22] Filed: Feb. 26, 1973

[21] Appl. No.: 335,728

Related U.S. Application Data

[63] Continuation-in-part of Ser. No. 132,182, April 7, 1971, abandoned, which is a continuation of Ser. No. 714,770, March 21, 1968, abandoned, and a continuation of Ser. No. 860,044, Sept. 22, 1969, abandoned.

[30] Foreign Application Priority Data

Sept. 28, 1968 Luxembourg .......................... 56945

[52] U.S. Cl. .................. 424/95; 424/105; 424/180
[51] Int. Cl.² ......................................... A61K 27/00
[58] Field of Search ....................... 424/95, 180, 105

[56] References Cited
OTHER PUBLICATIONS

The Encyclopedia of Biochemistry (1967) pp. 546–548.
Les Biocatalyseurs (1951) pp. 55–59.
Cumulated Index Medicus 1966 pp. S2595-S2598.
Cotte et al., American Perfumer and Cosmetics, Vol. 82, No. 4, 4/1967 pp. 47–48, 50, 52, 55–58.

*Primary Examiner*—Albert T. Meyers
*Assistant Examiner*—Norman A. Drezin
*Attorney, Agent, or Firm*—Cushman, Darby & Cushman

[57] ABSTRACT

Mucopolysaccharides are produced from the cutaneous teguments and umbilical cords of the foetus of a cow or of a sheep by grinding and extracting the same with an ionic extraction solution, enzymatically digesting the extracted material and recovering the same by precipitation or lyophylization.

38 Claims, No Drawings

MUCOPOLYSACCHARIDES, THEIR PREPARATION AND USE IN COSMETIC AND PHARMACEUTICAL COMPOSITIONS

This application is a continuation-in-part application of our copending application Ser. No. 132,182 filed Apr. 7, 1971, now abandoned, which, in turn, is a continuation of our application Ser. No. 715,770, filed Mar. 21, 1968, now abandoned, and our copending application Ser. No. 860,044 filed Sept. 22, 1969, now abandoned.

The present invention relates to mucopolysaccharides, a method for producing the same and to cosmetic acid pharmaceutical compositions containing said mucopolysaccharides.

It has already been known to produce a cosmetic composition containing an amniotic liquid from a ruminant animal which has completed less than about 40% of its period of gestation. Representative of such compositions are those containing an amniotic liquid withdrawn from a cow which is about 75 days pregnant. It has also been known to produce a cosmetic composition containing as its active component an aqueous extract from the skins of the foetuses of bovines and ovines. These active components can be obtained from a bovine foetus weighing from about 0.8 to 2 kg or from an ovine foetus weighing from about 0.5 to 0.9 kg, the skins of which, after having been pulverized, are treated with pure water to extract the active component.

The present invention differs from these known methods in several respects. For instance, the mucopolysaccharides of this invention are extracted from the cutaneous teguments and/or the umbilical cord of a bovine or ovine foetus using an ionic extraction solution. Further, the foetus need not be at any particular stage of gestation and in addition to the cutaneous tegument as a source of the mucopolysaccharide, the umbilical cord can also be employed for this purpose. It is however, essential that the active component, i.e. the mucopolysacchrides, be extracted from the cutaneous teguments and umbilical cords because extracts obtained under identical conditions, but from other portions of the foetuses, do not exhibit comparable characteristics when incorporated into cosmetic or pharmaceutical compositions.

The method of the present invention for producing mucopolysaccharides from a material selected from the group consisting of cutaneous teguments, umbilical cord and mixtures thereof, of the foetus of a cow or sheep, comprises grinding said material; extracting said ground material with an ionic extraction solution having a pH between 1.5 and 9 and present in amounts of about 1–20 ml/g of said ground material; digesting said extracted, ground material in the presence of a proteolytic enzyme present in amounts effective to digest said material, said digesting being continued until said material becomes fluid, thereby forming a broth; and recovering said mucopolysaccharides by (1) adding to said broth a solvent selected from the group consisting of acetone, methanol, ethanol, isopropanol and mixtures thereof in amounts effective to precipitate said mucopolysaccharides therefrom; separating said precipitated mucopolysaccharides; washing said separated mucopolysaccharides; and drying said mucopolysaccharides thereby providing mucopolysaccharides in the form of a white solid, soluble in water and a physiological serum solution and having a molecular weight ranging between 5,000–2,500,000, preferably between about 7,000–1,500,000, or (2) by adding to said broth a complexing agent selected from the group consisting of cetylpyridinium chloride and cetyltrimethylammonium bromide in amounts effective to form a complex of said mucopolysaccharides therewith thereby precipitating said mucopolysaccharide complex from said broth, adding to said precipitated mucopolysaccharide complex a 1–4 N saline solution of a salt selected from the group consisting of sodium chloride, potassium chloride and sodium sulfate to dissociate said mucopolysaccharides from the complexing agent, dialyzing said saline solution to produce a dialyzate consisting essentially of said mucopolysaccharides essentially free from said saline solution and said complexing agent lyophilizing said mucopolysaccharides thereby providing the mucopolysaccharides in the form of a white solid as described above.

It is also an object of the present invention to recover the mucopolysaccharides from the broth resulting from the digestion operation by first precipitating the proteins from the broth by adding an acid selected from the group consisting of perchloric acid and trichloroacetic acid in amounts such that the concentration of the acid in the respective mixture is between about 5–10 weight percent, removing said proteins by filtration, decantation or centrifugation, dialyzing the supernactant liquid, and then lyophilizing the dialyzate under standard conditions thereby providing the mucopolysaccharides in the form of a white solid as described above.

Grinding of the cutaneous teguments and umbilical cord can be carried out, preferably, in an ionic extraction solution, or in the presence of a solvent selected from the group consisting of acetone and ether, or dry. The temperature of the grinding is not critical but is generally effected between about less than 4°to about 80°C and more preferably at ambient temperature. When the grinding medium chosen is acetone or ether, the resulting ground material is generally dried before carrying out the ionic extraction operation.

Extraction of the ground cutaneous teguments and umbilical cord can be carried out in one or several operations and the ionic extraction solution employed in this phase of the present method, as well as in the grinding operation when its presence therein is desired, is selected from the group consisting of a 0.1–2.5 M aqueous solution of a neutral salt selected from the group consisting of sodium chloride and potassium chloride, a 0.1 M aqueous solution of an acid salt selected from the group consisting of sodium acid phosphate, potassium acid phosphate, disodium citrate, dipotassium citrate and mixtures thereof, an aqueous solution of hydrochloric acid having a pH of about 1.5 and a 1 N aqueous solution of sodium hydroxide. Generally about 1–20 ml of the ionic extraction solution per gram of ground cutaneous teguments and/or umbilical cord are employed. As for the grinding operation, the extraction is ordinarily carried out at a temperature comprised between less than 4° to about 80°C and more preferably at ambient temperature and lasts for a period ranging from about 24 to 48 hours. While a single extraction operation can be utilized, nonetheless, several successive extractions can also be performed whose total period also lasts between 24–48 hours.

The above described extraction step can be performed as an independent operation or in conjunction with the digesting operation, as defined above. One main purpose of the digesting operation is to sever proteins linked to the mucopolysaccharides and the operation can be performed in one stage or in several successive stages. When the latter is selected, the digesting medium conditions are generally adjusted to those favoring good functioning of the particular proteolytic enzyme employed. When this digesting operation is carried out simultaneously with the above described extraction operation, the pH of the combined extraction digesting medium is generally that which corresponds to the functioning pH of the selected enzyme. When the digesting operation comprises an independent or distinct phase in the overall method of the present invention, the pH of the digesting medium can be adjusted to the functioning pH of the selected enzyme by a standard buffer, acid or base.

The most currently employed proteolytic enzymes employed and the condition for using them are as follows:

| Enzyme | pH | Temp | Titer |
|---|---|---|---|
| Trypsin | 6.5–10 | 35–55°C | 250 units/mg |
| Ficin | 5.5–7.5 | 30–50°C | 15 units/mg |
| Pepsin | 1.5–3 | 30–50°C | 250 units/mg |
| Pronase | 6–8.5 | 30–50°C | 45 units/mg |
| Papain | 5–8 | 35–80°C | 100 units/mg |
| Pancretin | 6–8.5 | 20–50°C | |

Generally, 20–500 mg of the selected enzyme are employed per 100 ml ground material in the extraction solution, the titer of said enzyme ranging between about 10–300 units/mg.

The digesting operation is carried out for a period of time until the ground material becomes fluid, thereby forming a broth. Generally, this period lasts for about 15–72 hours.

It will be observed that the length of time for the digestion operation can be dependent upon the particular enzyme selected, weaker enzymes requiring longer digestion periods and stronger enzymes resulting in shorter digestion periods. The enzyme strengths, expressed in units/mg, above, are representative and can vary somewhat from the figures given depending upon the particular manufacturer supplying the same. Further it will be observed that for any given enzyme there are pH and temperature conditions indigeneous to the enzyme which must be observed, otherwise the enzyme will not function effectively or can even by destroyed. However, the art clearly recognizes these limitations and thus temperature and pH conditions during the digesting operation are limited only to this extent, i.e. that the particular enzyme selected be maintained in an environment favorable to its effective use.

In recovering the mucopolysaccharide from the broth resulting from the digestion operation, there can be added thereto, as stated above, a solvent selected from the group consisting of acetone, methanol, ethanol and isopropanol to precipitate the mucopolysaccharides. Generally, when acetone is selected for use it is employed in amounts of about 1–2 volumes per volume of broth, the addition of the acetone being continued until precipitation is essentially complete. When methanol, ethanol or isopropanol is employed, it is used in amounts sufficient such that the resulting mixture of the particular lower alkanol and broth contains about 40–96 percent by volume of the selected lower alkanol. Generally, also the pH of this mixture is adjusted to between about 4.5–6.5 by the addition thereto of acetic acid. It is also considered advantageous to facilitate the precipitation, by salting out, of the mucopolysaccharides to add to the said lower alkanol-broth mixture about 2–5 g of an acetate of sodium, potassium, barium or calcium, per 100 ml of said mixture.

One or more precipitations can be carried out on the broth with, in the case of successive precipitations, removal of precipitate from the supernactant liquid after each precipitation. Precipitation carried out on the supernactant liquid is generally performed with the use of a lower alkanol such as ethanol or isopropanol in amounts such that the resulting mixture of supernactant and lower alkanol contains about 80–97 percent by weight of the lower alkanol. The precipitates resulting from these successive operations are then mixed.

After the precipitation operation is completed, the resulting mucopolysaccharides are recovered by filtration, decantation or centrifugation and then washed and dried. Ordinarily washing is carried out in a three stage operation, first with ethyl alcohol, then with a 50:50 volume mixture of ethyl alcohol and ether, and finally with ether.

An alternative method of recovering the mucopolysaccharides from the broth resulting from the digestion operation comprises adding thereto a quaternary ammonium complexing agent selected from the group consisting of cetylpyridinium chloride or cetyltrimethylammonium bromide in amounts such that the resulting mixture contains about 0.1–2 percent by weight of said quaternary ammonium complexing agent, and a salt selected from the group consisting of NaCl, KCl and $Na_2SO_4$ in amounts such that the concentration of said salt in the resulting mixture is between about 0.003–0.05 M. In this alternative recovery method the mucopolysaccharides precipitate as a complex with the quaternary ammonium agent, insoluble in the dilute salt solution.

The mucopolysaccharide can be dissociated from the thus formed complex by the addition thereto of a concentrated saline solution (1–4 M solution of NaCl, KCl or $Na_2SO_4$). The mucopolysaccharides pass into solution under these conditions and the salt is removed there from by dialysis. The resulting dialyzate consisting essentially of said mucopolysaccharides, essentially free from said saline solution and said complexing agent is then lyophilized to produce the said mucopolysaccharides in the form of a white solid, as described above.

An other alternative method of recovering the mucopolysaccharides from the broth resulting from the digestion operation comprises the step of adding thereto a protein precipitating agent selected from the group consisting of perchloric acid and trichloroacetic acid in amounts such that the concentration of the acid in the respective resulting mixture is between about 5–10 weight percent, the step of removing said proteins either by centrifugation at a speed of about 2.500 to 10.000 rpm or by filtration or decantation, dialyzing against water the supernactant liquid, and then lyophilizing the dialyzate under standard conditions thereby providing the mucopolysaccharides in the form of white solid as described above.

According to the present invention the lyophilisation when used is carried out at a temperature comprised between about −30°C to about −80°C. The mucopolysaccharides of the present invention contain neither free amino acids nor small free polypeptides having a molecular weight less than 5.000.

It has also been found advantageous, though not necessary to the production of mucopolysaccharides effective for use in the cosmetic and pharmaceutical compositions of this invention, to remove proteins from the system prior to recover the mucopolysaccharides, either by adding to the broth a solvent selected from the group consisting of acetone, methanol, ethanol, isopropanol and mixtures thereof or by adding to said broth a complexing agent selected from the group consisting of cetylpyridinium chloride and cetyltrimethylammonium bromide such as above described. Generally this optional protein-removing operation immediately precedes either of these recovery stages although it can also precede the digestion stage. In any event the protein-removing operation always occurs subsequent to the grinding and extraction operations. This protein-removing operation is the same as above described and consists in adding to the extracted, ground material (when this operation immediately follows the extraction operation) or to the broth (when this operation immediately follows the digesting phase) an acid selected from the group consisting of perchloric acid and trichloroacetic acid in amounts such that the concentration of the acid in the respective resulting mixture is between about 5-10 weight percent thereof. The proteins as above described are removed from the supernactant either by centrifugation or by filtration or decantation. It will also be observed that two such protein-removing operations can be employed, one to precipitate proteins prior to the digesting operation, the other to precipitate proteins linked to the mucopolysaccharides after the enzymatic digesting operation. While this optional phase of the present invention has been found to improve or enhance the properties of the resulting mucopolysaccharides, it has also been found to reduce somewhat the yield of recoverable mucopolysaccharides. For this reason, it is sometimes preferred not to incorporate this phase into the overall process to produce the mucopolysaccharides.

The protein-removing operation is generally followed by a dialyze against water for a period of about 15 to 25 hours in order to eliminate small amino-acids and electrolytes. Thereafter, the resulting dialyzate can be filtered on "Celite" (infusional earth).

It should be noted that when the temperature of the different steps is higher than about 4°C, the sterility is attained by providing a layer of toluene or by introducing a thymol crystal or both in the medium. (This is particularly the case during the digestion operation).

TOXICITY STUDY OF THE MUCOPOLYSACCHARIDES OF THE PRESENT INVENTION

Tests of the active compounds for toxicity have been carried out on Wistar rats using equal numbers of both sexes weighing 150 g ± 10 g, an equal number of both sexes of Swiss mice weighing 25 g ± 2 g, and equal numbers of both sexes of albine Bouscat rabbits weighing 2.5 kilos ± 100 g.

3 g of the active compound extracted from the cutaneous teguments of the foetuses of cows and sheep per kilo of animal were intraperitioneally injected into 10 rats and 10 mice without any resulting mortality.

The same active compounds were injected intravenously into 10 rabbits at the rate of 100 mg per kilogram of animals, and no mortality or other adverse effect was noted.

TOLERANCE TESTS

A dorsal area about 5 cm × 3 cm on each of 30 Wistar rats (15 male and 15 female) weighing about 180 g ± 10 g, and belonging to a lot to be treated with the active product, was shaved.

0.5 ml of an aqueous 4% solution of the active product, prepared as described hereinafter in Example 1, was applied daily for 3 weeks to the shaved areas.

At the end of this time it was found that the growth of these animals had proceeded normally, when compared with that of a control group of 30 animals of the same breeding which had received only the same volume of the solvent without the active compound, applied to a like shaved area.

No difference as to illness or lesions was noted between the animals in the group treated with the active product and those in the control group.

TESTS OF THE ACTIVE COMPOUND

In a first series of tests a group of 40 Wistar rats weighing 130 g ± 5 g, all of the same breeding and genetically very closely related was subdivided into 4 lots (I, II, III, IV), comprising 10 rats each.

All the animals had been nourished in the same way before the tests, that is, they were fed rat biscuits containing 7% protein, carrots and water as demanded, and their growth continued normally for 2 weeks before the tests.

The rats in lots I and II were then placed on a biotin-free diet for 3 weeks.

During this same 3 week period, the animals of groups III and IV were given normal nourishment.

The day before the first application, the animals of groups III and IV were shaved on a dorsal area of 5 cm × 3 cm extending onto both sides of their vertabrae, so as to define an area of application.

The animals of group I were then treated daily for ten days by applying a solution of the active product prepared in accordance with Example 1 below, at a concentration of 1.5% by painting with a brush on the portions of their backs which had been shaved.

Group II, which serves as a control group, was treated in the same way with 0.5 ml of distilled water.

Group III was treated with the active product in the same way as group I.

Group IV, which served as a control group, was treated with 0.5 ml of distilled water in the same way as the animals of group II.

The treatment was carried out for 10 days, at the end of which all of the animals in all of the groups were clinically examined, and the dorsal skin covering the area of application removed after killing them.

A histological examination of this part of the cutaneous tegument was carried out and the lipides gravimetrically measured.

The clinical examination made it possible to establish that in the rats of group I there was an appreciable reduction in the greasiness and stickiness of the hair, whereas in the animals of group II, which were not treated, no improvement was found, but on the contrary, their condition continued to deteriorate.

On the other hand, the growth of the animals in groups III and IV (the healthy animals) continued normally and no difference between the two groups was noted in this respect. The growth of the animals in groups I and II continued at the same rate in both groups, but more slowly than in the case of the normal animals.

The histological examination showed that there was a decrease in the size and number of the sebaceous glands in the animals of group I as compared to those of the animals of group II.

Finally, the measurement of the lipides showed a decrease of the order of 30% in the average quantity of lipides on the animals of group I as compared with those of group II. However, this difference was less when the animals of group III were compared with those of group IV, as is normal since no pathological condition existed, and consequently there was less response to external therapeutic treatment.

The same tests were carried out in the same way as above described, using the same dosage of active products, but extending the period of treatment to 15 days on half the animals of each group and to 22 days on the other half of each group.

Subsequent clinical examination showed:
a 75% decrease in the superficial lipides in the animals of group I and 45% in the animals of group III after 14 days of application;
a 50% decrease average quantity of superficial lipides in the animals of group I and 32% in the normal animals of group III after 21 applications.

PHARMACODYNAMIC STUDY OF THE MUCOPOLYSACCHARIDES OF THE PRESENT INVENTION

I. Action on Isolated Organs a. Action on the Ileum of a Guinea Pig:
own action:
The mucopolysaccharides show no action on the smooth fiber at doses varying from 0.025 to 10 mg/70 ml.
action towards acetylcholine:
The mucopolysaccharides do not cause either intensification or inhibition of the contraction of the ileum caused by 25 µg of acetylchloline.
The doses tested vary from 0.5 to 5 mg/70 ml and the contact time varies between 30 seconds and 3 minutes.
The action of the mucopolysaccharides was determined with and without washing of the organs.
action towards histamine:
The mucopolysaccharide doses varying from 0.2 to 40 mg show no action on the contraction of the ileum caused by 1 µg of histamine.
b. Action on the Duodenum of a Rat:
The mucopolysaccharides have no action whatsoever on the contraction of the duodenum of a rat caused by 25 µg of acetylchlorine. They can however cause a slight decontraction during washing.

II. Experiments on Rabbits in Vivo

The action of the mucopolysaccharides on the arterial pressure, the respiration, the electrocardiograph and the chemical intermediates such as adrenalin, acetylcholine and histamine was studied in the case of the rabbit.

The experiments are carried out on white rabbits of both sexes, of average weight 3 kg, put to sleep with a 10% strength urethane solution at the rate of 10 ml/kg administered intravenously.

The arterial pressure is determined by the strapping method on the external carotid, using a canula connected to a pressure head and a recorder.

The respiration is recorded similarly.

The electrocardiograph is taken in $D_2$ derivation right arm, left leg.

The external saphenous vein with the canula is used for the intravenous injections.

The mucopolysaccharides produced in accordance with the present invention and administered intravenously at doses of 4, 8, 10, 20, 30, 40 and 50 mg/kg produce no disturbance of the normal pressure curve. Against this, an increase in the respiration amplitude can be observed under the action of repeated doses of mucopolysaccharides.

The mucopolysaccharides produced in accordance with the present invention and administered intravenously, cause a moderate and transient hypotensive point at low doses. At a dose of 30 mg/kg, a hooked hypotensive curve is observed, the intensity of which is contant even at higher doses, but which is of transient duration.

The action on the respiration varies and produces either a slight lowering of the amplitude at a low dose or a bi-phase action at a high dose (50 mg/kg).

The mucopolysaccharides produced in accordance with the present invention have no action on the arterial pressure up to a dose of 10 mg/kg. At 20 mg/kg a progressive hypotension of low intensity but of rather long duration is observed.

An increase in the respiratory amplitude can also be observed.

From 10 to 20 mg/kg the mucopolysaccharides have no effect on the pressure phenomena caused by adrenalin, acetylcholine and histamine.

At 25 mg/kg, a slight increase in the domed hypotensive curve of adrenalin and a lengthening of the hypotension caused by acetylcholine can be observed.

In the electrocardiograph, doses of 10 and 20 mg/kg cause no change in either the rhythm or the amplitude.

At 40 mg/kg certain disturbances appear.

No changes in the pressure curve and respiratory curve is observed on topical administration of the mucopolysaccharides to rabbits.

Finally, a comparative study between the mucopolysaccharides according to the invention and cortisone has shown that the former have no effect on the corpuscle count and on the blood formula.

For this study, one of two groups of male rats weighing 250 g were treated for 8 days by an intraperitoneal injection of mucopolysaccharides according to the invention at a dose of 200 mg/kg and the other group was treated by intraperitoneal injection of cortisone at the same dose.

The count and the blood formula were checked on the ninth day relative to a group of normal comparison rats.

| Comparisons | Mucopolysaccharides | Cortisone |
|---|---|---|
| white corpuscles 16,500 | 16,520 | 8,600 |

Furthermore, the reduction in the number of eosinophilic corpuscles and of lymphocytes and the increase in the polynuclear corpuscles is markedly less pronounced after treatment with the muscopolysaccharides than after treatment with cortisone.

The muscopolysaccharides according to the invention thus have little or no side-effects which could be harmful to their use.

II. STUDY OF THE ANTICELLULITIS ACTIVITY OF THE MUCOPOLYSACCHARIDES ACCORDING TO THE INVENTION

These experiments were carried out on female rats of the Wistar race of which a certain number had been ovariectomised. In fact, an accumulation of lipids and of water occurs after ovariectomy in female rats which is very similar to the phenomnon observed in a woman suffering from cellulitis. This effect arises in female rats after a period which is generally of the order of 2 to 3 months calculated from the ovariectomy.

The experiment required three batches of 10 animals of the sme origin.
 a. A first batch served as normal (non-ovariectomised) reference females;
 b. A second batch served as ovariectomised reference females;
 c. A third batch had the product administered to them, the female rats of this batch again being ovariectomised.

All the female rats of batches (b) and (c) were ovariectomised on the same day and in the case of the experiment reported here the effect similar to that of cellulities was observed in akl the female rats 2½ months after the ovariectomy.

The first batch did not undergo any treatment, while the second batch was treated daily for 12 days with 0.5 ml of distilled water per animal, and the third batch was also treated daily for 12 days with 0.5 ml per animal of a solution of mucopolysaccharides of the present invention in distilled water obtained according to Example 1 described below, the concentration being 2.5 g of dry extract per 100 ml of solution.

In the case of the second and third batches, the administration is carried out over a dorsal area of about 3 $cm^2$ which has beforehand been shaved.

On the day after the last administration the rats were all weighed and killed.

The samples of skin corresponding to the administration zones made it possible to establish the following average results for the weights of water and of lipids.

| Condition of the animals | Variation in weight | Water content | Lipid content |
|---|---|---|---|
| non-ovariectomised | +9 g | 290 | 136 |
| ovariectomised (ref.) | +9 g | 329 | 156 |
| ovariectomised, treated | +5 g | 285 | 110 |

This experiment was repeated under the same conditions on another group of animals, the results were confirmed.

It thus appears, in the light of the results of these experiments, that the administrations of the mucopolysaccharides of the present invention to the skin of female rats caused a reduction in the accumulation of lipids of the cutaneous teguments and also a reduction in the water retention.

It can furthermore be stated that one is not dealing with a dehydration of the skin but with an effect of regulating the water content, because the water content of the normal untreated female rats and of the treated ovariectomised female rats is essentially similar.

III. STUDY ON ERYTHEMA CAUSED BY ULTRAVIOLET LIGHT

A group of 20 Albino Bouscat rabbits weighing 2.5 to 3 kg were irradiated at the height of the sternoabdominal regin, shaved beforehand to 1/10 mm, for a period of 15 minutes with ultraviolet rays from a 500 watt lamp positioned at a distance of 35 cm from the skin of the animals, over four areas of 3 $cm^2$, each being defined by masks. After 48 hours following the irradiation, 2 ml of an aqueous solution of the mucopolysaccharides obtained in accordance with Example 1, below, at a concentration of 2% of solids, were applied to 10 rabbits in the areas which had suffered lesions because of these irradiations.

It is found that the number of days required for cicatrization was between 4 and 7 days for the animals treated with these compositions while the time was 10 to 15 days for the reference rabbits.

It is thus seen that the invention allows the healing time to be reduced by about 50%.

Similar results were obtained with compositions in the form of an ointment made up in the following proportions:

| | |
|---|---|
| Paraffin oil | 30 g |
| Stearic acid | 3 g |
| Triethanolamine | 0.2 g |
| Tween 60 (oxyethyleneated sorbitan monostearate) | 2 g |
| Arlacel 165 (self-emulsifiable glycerine monostearate) | 6 g |
| Bactericide | 0.3 g |
| Mucopolysaccharides obtained according to Example 1, below | 1 g |
| Water, q.s.p. | 100 g |

IV. Study of the Anti-inflammation Activity of the Compounds According to the Invention 1. The anti-inflammation activity of the compositions based on mucopolysaccharides according to the invention was studied using the experimental kaolin oedema.

For this purpose, female rats weighing 150 g and coming from one and the same raising were divided into groups of 10 animals each.

The oedema is caused by injecting 0.1 ml of a sterile 10% strength kaolin suspension under the plantar surface of the left hind paw of the animal.

For each experiment, a first group of animals serves as a reference group. The difference between the weight of the left hind paw of each animal on which the oedema was caused and the weight of the right rear paw which is unaffected serves as a measure of the intensity of the oedema.

The other groups of animals are subjected to either preventative or curative treatments with mucopolysaccharides according to the invention on the one hand and cortisone on the other.

These various treatments have the effect of reducing the extent of the oedema caused on the left hind paw of the animal.

The reduction in percent in the difference in weight between the left hind paw and the right hind paw of the animals of each group relative to the difference in weight of the left hind paw and the right hind paw of the reference group of animals provides a measure of the effectiveness of the various treatments tested.

The anti-inflammation activity is measured 3 hours after the local injection of kaolin and the animal is killed by blood-letting. The two hind paws are then taken. The difference in weight between the two paws measures the severity of the oedema.

The treatment with the mucopolysaccharides according to the invention can be carried out at various times relative to the kaolin injection depending on whether the curative effect or the preventive effect of the mucopolysaccharides is to be investigated.

The solutions of mucopolysaccharides according to the invention are injected at the rate of 1 ml per 100 g of body weight.

In the case of cutaneous administrations, a solution of mucopolysaccharides of concentration 50 mg per ml is used. The animal receives 0.5 ml of this solution on each administration.

In the majority of cases the anti-inflammation activity of the mucopolysaccharides according to the invention was compared to that of cortisone.

A. Mucopolysaccharides Produced from the Foetus of a Cow

The mucopolysaccharides according to the invention are extracted from cutaneous teguments of the foetus of a cow in one case and from the umbilical cord of the foetus of a cow in the other.

a. Preventative treatment:

The mucopolysaccharides are administered at the rate of 3 doses of 200 mg/kg in the 24 hours preceding the local injection of kaolin, the first dose being given 24 hours before administration of the kaolin.

The second and third doses are administered 4 hours and 1 hour before the kaolin.

The results observed are compiled below:

| | | |
|---|---|---|
| 200 mg/kg administered intraperitoneally | cutaneous tegument | 45% |
| | umbilical cord | 33% |
| | cortisone | 59% |
| 200 mg/kg administered subcutaneously | cutaneous tegument | 50% |
| | cortisone | 53% |
| 0.5 ml administered cutaneously | cutaneous tegument | 18% |
| | umbilical cord | 20% | b. Curative treatment:

The animals receive three doses of 200 mg/kg of mucopolysaccharide extract according to the invention 1 hour, 18 hours and 23 hours after the administration of the kaolin.

The animals are killed 1 hour after the third dose.

The results observed are compiled below:

| | | |
|---|---|---|
| 200 mg/kg administered subcutaneously | cutaneous tegument | 10% |
| | cortisone | 18% |
| 0.5 ml administered cutaneously | cutaneous tegument | 22% |
| | cortisone | 20% |

B. Mucopolysaccharides produced from the Foetus of Sheep a. Short-term preventive treatment by intraperitoneal injection at various doses.

As in the preceding experiments, the activity of the mucopolysaccharides according to the invention was compared with that of cortisone and the results observed are compiled below:

| Dose* | cutaneous tegument | cortisone |
|---|---|---|
| 5 mg | 16% | 8% |
| 25 mg | 30% | 21% |
| 50 mg | 49% | 29% |
| 100 mg | 57% | 40% |
| 200 mg | 86%, 78%, 87% | 45%, 51%, 28% |

*by intraperitoneal injection b. Short-term preventative treatment by topical administration.

In order to compare the activity of the mucopolysaccharides according to the invention, a hydrocortisone ointment is used while the mucopolysaccharides are dissolved in a buffered solution.

The results observed are compiled below:

| | | |
|---|---|---|
| 0.5 ml | cutaneous tegument | 23% |
| 500 mg of a 2.5% strength ointment | cortisone | 34% |

The anti-inflammation activity was also studied using the experimental kaolin oedema, but on suprarenalectomised rats.

Under identical experimental conditions to those above, the action of the mucopolysaccharides according to the invention is found to be unaffected in the case of the suprarenalectomised rats.

Thus the mucopolysaccharides do not act on the suprarenal glands so as to facilitate the liberation of cortisone. Their effect is thus totally independent.

2. The anti-inflammation activity of the mucopolysaccharides according to the invention was also studied for other experimental oedemas.

a. Experimental bradykinin oedema.

This oedema is caused by sub-plantar injection of 0.1 ml of a solution containing 0.1 mg/ml of synthetic bradykinin (calbiochem). This experiment comprises a preventative treatment 1 hour beforehand and killing the animals 15 minutes after the oedema manifests itself.

| | | |
|---|---|---|
| 200 mg/kg administered intraperitoneally | cutaneous tegument | 12% |
| | cortisone | 14% | b. Experimental carraghenin oedema.

The experimental carraghenin oedema is the one where the symptoms come closest to those of rheumatic illnesses. This oedema is caused under similar conditions to the oedema brought about with kaolin. 0.1 ml of a 2% strength carraghenin solution is applied by sub-plantar injection.

| | | |
|---|---|---|
| 200 mg/kg administered intraperitoneally | cutaneous tegument | 68% |
| | cortisone | 25% |

V. Study of the Capillary Permeability of the Compounds According to the Invention For this purpose the rats are first shaved on their back on the eve of the experiment. 1 ml of 1% strength of Prontamine Sky Blue is then injected intravenously. 5 minutes after this injection the rats receive 3 intradermal injections of 0.1 ml of a 1 mg/ml solution of histamine on the left side. The time for the dyestuff to appear at the level of the intradermal papule is then observed. These same rats are then given the mucopolysaccharides according to the invention at a dose of 200 mg/kg by intraperitoneal injection. After 30 minutes the right side of the rats is given the same treatment as the left side. The time for the dyestuff to appear is then observed as in the preceding case.

| Appearance time | left side (comparison) | right side (treated) |
|---|---|---|
| | 4'45" | 5'30" |

The mucopolysaccharides thus have a marked action on the capillary permeability.

VI. Study of the Cicatrising Activity of Wounds Experimentally Disturbed by Cortisone Epithelial wounds were caused on the ears of a rabbit by means of a punch. The cicatrisation is delayed by daily intraperitoneal injection of a 25 mg/ml cortisone solution at the rate of 25 mg/kg for 4 days.

The daily administration for 15 days of a solution of mucopolysaccharides according to the invention, at a concentration of 50 mg/ml, at the rate of 0.1 ml per wound, returns the cicatrisation curve towards normal, especially from the 10th day onwards.

The intraperitoneal injection of the mucopolysaccharides at the rate of 25 mg/kg returns the cicatrisation curve towards normal from the fourth day onwards.

Thus it can be seen that the mucopolysaccharides of the present invention can be usefully employed in a number of ways.

For instance, these mucopolysaccharides can be employed to produce a composition for application to the hair and skin, said composition consisting essentially of an aqueous solution of the mucopolysaccharides present in amounts of about 0.5–5% by weight and preferably 1.5–3% by weight of said composition and having a pH of about 3.5–9. These compositions can be in the form of lotions, gels, creams, pomades, sprayable aerosol formulations under pressure, shampoos, lacquers, hair-setting lotions and permanent hair waving or setting formulations. In this form, the compositions of the present invention are, when applied to the hair and scalp, effective to reduce a greasy appearance of the hair and a reduction in excessive secretion of sebum from the scalp. When topically applied to the skin, the compositions of the present invention are employed, for instance, in anticellulitis use, in which case they can also contain enzymes known to affect the metabolism of lipids and mucopolysaccharides, such as hyaluronidases, lipases and thiomucases, in amounts of about 1–5% by weight of said composition. These compositions are also usefully employed to combat ageing and degradation of cutaneous tissue, as an anti-inflammation composition to combat blotchiness, sunburn, redness and as a composition effective in the cicatrization of wounds and burns.

The mucopolysaccharides of the present invention are also usefully employed to produce a pharmaceutical composition for intramuscular injection consisting essentially of a non-toxic physiological aqueous solution of said mucopolysaccharides present in amounts of about 0.1 to 5% by weight of said solution having a pH of about 6.5 to 7.5, preferably about 7. These compositions when injected intramuscularly are effective as anti-inflammatory compositions in the treatment of acute inflammations such as edemas and mild burns and of subchronic inflammations such as arthritis and rheumatism. They are also effective in the cicatrization of wounds.

The mucopolysaccharides of the present invention are also usefully employed to produce a pharmaceutical composition for oral ingestion consisting essentially of a mixture of a non-toxic ingestible carrier and said mucopolysaccharides present in amounts of about 10 parts by weight per cent by weight of said ingestible carrier. Representative orally ingestible carriers is ethylcellulose although it will be recognized that other conventional non-toxic ingestible carriers can also be employed. These orally ingestible compositions can be in a variety of forms, such as microcapsules. Again, however, it will be obvious that they can also take other conventional forms such as pills, powders, granules, tablets and the like.

EXAMPLES OF PREPARATION

Example 1

1746 g of the cutaneous teguments of the foetus of cows are removed under aseptic conditions. The foetuses are from 20 to 120 days old and are of both sexes. Immediately after removal, the cutaneous teguments, which can be frozen at a temperature of −20°C, are ground in the presence of 15 ml of a saline solution per gram in a U-Turrax TP 45/2 apparatus rotating at about 10,000 rpm for about 15 minutes, under sterile conditions, the sterility being attained by a thymol crystal.

During the entire grinding operation, the ensemble is cooled to keep the temperature of the material being ground from exceeding 10°C. The saline solution employed consists of a 0.1 M solution of sodium acid phosphate, said solution having a pH of 6.5.

To the resulting ground material there are added 300 g of papain having an enzymatic activity of 100 units/mg, 788 mg of cysteine hydrochloride and 18.6 mg of ethylene diamine tetra acetic acid, per 100 ml of solution. The digestion of the proteins is continued for 15 hours at 65°C. During this phase, the sterility of the medium is again maintained by the presence therein of a small crystal of thymol.

The broth, resulting from this digestion operation is then treated with trichloroacetic acid in a final concentration of 7.5 weight percent thereof thereby precipitating the proteins. The broth is then centrifuged in a Jouan centrifuge, type C 60 TS, rotating at 4,500 rpm for a period of about 30 minutes. Thereafter the supernactant liquid is removed and the separated protein fraction discarded.

The supernactant liquid is then dialyzed against distilled water to eliminate electrolytes present in the supernactant liquid for 18 hours, the dialysis membrane being made of cellulose material. The resulting dialyzate is then filtered through an absorbent powder sold under the tradename Celite.

To the resulting essentially electrolyte-free dialyzate there are added 2 liters of absolute ethyl alcohol and 50 g of sodium or potassium acetate, per liter of dialyzate whose pH has previously been adjusted to 5.8 with acetic acid, thereby precipitating the mucopolysaccharides of the present invention.

The mucopolysaccharide-containing precipitate is then purified by three successive washings; the first with absolute ethyl alcohol, the second with a 50-50 ethyl alcoholether mixture and the third with ether. The thus purified mucopolysaccharides are then dried.

The resulting active product is in the form of a white powder, soluble in water and physiological serum solutions.

The process yields 16 g of active product, i.e. 9.2 g per kilo of cutaneous teguments, and contains about 26 mg of hexosamines per gram of mucopolysaccharide.

In another example, the same steps are carried out under the conditions described above, but using as a starting material 1881 g of the umbilical cord of a cow's foetus between 1-9 months old. This process yielded 4.25 g of the active product in powder form, i.e. 2.25 g per kg of umbilical cord. The active product contains 185 mg of hexosamines per kg of mucopolysaccharides.

Example 2

Under aseptic conditions 1 kg of cutaneous teguments of sheep foetuses, between 1-6 months old, are removed. The foetuses are of either sex. Immediately after removal, the cutaneous teguments are ground in water whose pH has been adjusted to 1.5 by a 8 N hydrochloric acid solution. 5 ml of water per gram of cutaneous teguments are employed. The ginding apparatus described in Example 1 is employed and during the entire grinding operation, the sterility is maintained by a thymol crystal.

To the resulting ground material there are added 2 g/liter of pepsin having an enzymatic activity of 250 units/mg. The digestion is continued for 3 days at 37°C. During this phase, the sterility of the medium is maintained by a layer of toluene and some thymol crystals dispersed in the digesting medium.

At the end of the 3 day period, the pH of the digesting medium is adjusted to 7 by the addition thereto of 10 N sodium hydroxide. Then 2 g/liter of trypsin are added, this enzyme having an activity of 250 units/mg. The digestion is then continued for 24 hours at a temperature of 37°C. The resulting broth is then filtered on Celite.

The filtrate thus obtained is adjusted to a pH of 6 by the addition thereto of 0.25 N acetic acid. There are then added to one liter of this filtrate 25 grams of calcium acetate and 2 liters of ethanol to precipitate the mucopolysaccharides.

The filtrate is then permitted to stand overnight and the supernactant liquid is then decanted and discarded. The mucopolysaccharide precipitate is then centrifuged for 30 minutes at 4500 rpm. The precipitate is washed first with ethyl alcohol, then with a 50-50 ethyl alcohol-ether mixture and finally with ether, after which the precipitate is dried. The process yields 10 g of the active product in powder form.

In Examples 1 and 2, the grinding operation can be performed separately from the extraction phase, in which case the material is ground dry.

Example 3

Under aseptic conditions, 500 g of cutaneous teguments of cow foetuses between 3-9 months old are removed. The foetuses are of either sex. Immediately after removal, the cutaneous teguments are ground in a 1 N sodium hydroxide solution present in amounts of about 5 ml per gram of cutaneous teguments. The grinding apparatus described in Example 1 is employed and during the entire grinding operation, the ensemble is cooled with ice and dry ice to keep the temperature of the material being ground from exceeding 4°C. The ground material is permitted to stand for 24 hours at a temperature of about 37°C. The pH of the ground material is then adjusted to 10 by the addition thereto of acetic acid.

To the thus pH adjusted ground material there are added 100 mg of trypsin per 100 ml of the ground material, said enzyme having an enzymatic activity of 250 units/mg. The digestion is continued for 20 hours at 50°C, after which the digestion medium is filtered on Celite.

The resulting filtrate is adjusted to a pH of 6.5 by the addition thereto of acetic acid. There are then added 5 g of potassium acetate and 200 ml of isopropyl alcohol, per 100 ml of the pH adjusted filtrate to precipitate the mucopolysaccharides.

The filtrate is then permitted to stand for 24 hours and the supernatent liquid is then decanted at about 4°C and discarded. The mucopolysaccharide precipitate is then centrifuged, as in Example 2, and the collected precipitate is washed first with ethyl alcohol, then with a 50-50 ethyl alcohol-ether mixture and finally with ether. The precipitate is then dried, yielding 2 g of white powder.

This Example is repeated except that during the precipitation of the mucopolysaccharides, 900 ml of isopropyl alcohol per 100 ml of the pH adjusted filtrate are employed rather than the previously used 200 ml. This variant of the process yields 2.5 g of the mucopolysaccharides in white powder form.

Further, this Example is repeated except that the grinding operation is performed independently of the extraction stage. In this variant, the grinding is carried out in acetone and the ground material is then dried and dissolved in a 1 N sodium hydroxide solution present in amounts of about 5 ml per gram of the ground material. The remaining steps are then performed in the manner indicated above.

Again this Example is repeated except that instead of precipitating the mucopolysaccharides from the pH adjusted filtrate by the addition thereto of potassium acetate and isopropyl alcohol, there is added to this pH adjusted filtrate a sufficient amount of a 0.1% solution of cetylpyridinium chloride in 0.03 M NaCl to produce a complex of the mucopolysaccharides with the cetylpyridinium chloride. The resulting mixture is permitted to stand at room temperature for several hours. The mucopolysaccharide-quaternary ammonium complex thus produced is then dissociated by the addition thereto of a NaCl solution of increasing concentration (from 0.3 to 3 M). The mucopolysaccharide-containing solution thus obtained is desalted by dialysis against running water for 18 hours. The resulting mucopolysaccharide-containing dialyzate is then lyophilized at −40°C.

Example 4

Under aseptic conditions, 500 g of cutaneous teguments of sheep foetuses between 2–3 months old are removed. The foetuses are of either sex. The cutaneous teguments are ground in acetone, then ether, with a thymol crystal after which the ground material is dried.

The resulting ground material is then suspended in a 0.14 M sodium chloride solution present in amounts of about 5 ml per gram of cutaneous teguments. The resulting suspension is stirred for 1 hour. Three successive similar extractions are then performed, each for about 1 hour using a 0.14 M sodium chloride solution in amounts of about 2 ml per gram of the cutaneous teguments. At the end of each of these four extractions, the liquid is recovered and then mixed together the resulting mixture then being filtered on double gauze to provide a first filtrate.

The total cutaneous tegument containing residue remaining after these four extractions is again extracted with a 2.1 M NaCl solution present in amounts of about 5 ml per gram of residue, with mechanical stirring for 24 hours. The extraction medium is then filtered on gauze to produce a second filtrate whhich is then mixed with the above said first filtrate.

To this mixture of filtrates there is then added a 1.8 M perchloric acid solution to obtain a final concentration of perchloric acid of 5%, thereby precipitating free proteins from the filtrate mixture. This mixture is then permitted to stand for 4 minutes, after which it is filtered on a Whatman No. 4 filter. The filtrate thus obtained is then dialyzed against distilled water for 18 hours, the dialysis membrane being made of a cellulosic material.

Sodium bicarbonate is then added to the resulting dialyzate until a pH of 8 is reached. To this pH adjusted dialyzate there are added 25 mg of typsin per 100 ml of dialyzate, said enzyme having an enzymatic activity of 250 units/mg. A small crystal of thymol is added to this digesting medium and digestion is continued for 18 hours at 45°C.

To the resulting digestion broth there is added sufficient 3.1 N trichloroacetic acid until there is obtained in the broth a final concentration of said acid equal to 10%. This procedure causes the proteins linked to the mucopolysaccharides to precipitate. The broth is then allowed to stand overnight at a temperature of about 4°C, after which it is centrifuged for 30 minutes at 4,500 rpm. To the resulting essentially electrolyte-free supernactant there are added 200 ml of absolute ethyl alcohol and 5 g of sodium acetate per 100 ml of supernactant. At the time of precipitation the pH of the solution is of about 5. After standing overnight at about 4°C the mucopolysaccharide precipitate is then recovered by centrifugation at 4,500 rpm for 30 minutes and then, as before, washed first with ethyl alcohol, then with a 50-50 ethyl alcohol-ether mixture and finally with ether. The washed precipitate is then dried, yielding 135 mg of the active product in powder form.

The above Example is repeated except that the ionic extraction solution is one containing essentially equivalent amounts of potassium chloride rather than sodium chloride. In this variant, 150 mg of the active product in powder form are obtained.

Example 5

Under aseptic conditions, 1,800 g of cutaneous teguments of cow foetuses between 2–6 months old are removed. The foetuses are of either sex. Immediately after removal, the teguments are ground in the presence of 10 ml of a saline solution per gram of teguments in a U-Turrax TP 45/2 apparatus rotating at 10,000 rpm for about 15 minutes. The saline solution comprises a 0.1 M solution of potassium acid phosphate having a pH of 6.5. During the entire grinding operation carried out at room temperature the sterility is maintained by a thymol crystal. The resulting ground material is then permitted to stand for 48 hours at a temperature of about 8–12°C.

Thereafter, there are added per 100 ml of ground material, 350 mg of papain having an enzymatic activity of about 100 units/mg, 780 mg of cysteine hydrochloride and 18.5 mg of ethylene diamine tetracetic acid, and the digestion is continued for 30 hours at 50°C. During this operation, the sterility of the digesting medium is maintained by the addition thereto of a small thymol crystal and a surface layer of toluene.

The resulting broth is then treated with trichloroacetic acid in amounts such that the final concentration of the acid in the broth is 9%. The broth is then centrifuged in a Jouan type C60 TS centrifuge revolving at 4500 rpm for 30 minutes and the supernatant liquid is the collected and dialyzed against distilled water for 20 hours, the dialysis membrane being made of a cellulosic material.

The resulting dialyzate is then filtered through Celite and to the thus filtered dialyzate there is added sufficient NaCl to obtain a final NaCl concentration of 0.03 M. There is then added a solution of cetylpyridinium chloride until there is obtained in the resulting mixture a concentration of this quaternary ammonium agent of 1%. The mixture is permitted to stand for 3 hours at 35°C, after which it is centrifuged. The deposit, comprising a mucopolysaccharide-quaternary ammonium complex is then washed with a 0.03 M solution of NaCl containing 0.05% cetylpyridinium chloride. The mucopolysaccharide complex is dissociated by the addition thereto of a 4 M solution of NaCl and the mucopolysaccharide-containing solution thus obtained is desalted by dialysis against running water for 18 hours. The resulting dialyzate is then lyophilized at −50°C.

The above Example is repeated except that potassium acid phosphate containing saline solution employed in the grinding-extraction stage is replaced by an essentially equivalent amount of 0.1 M disodium citrate having a pH of 6. The active product produced according to this variant exhibits essentially the same activity characteristics.

Again this Example is repeated except that (1) the potassium acid phosphate containing saline solution employed in the grinding-extraction stage is replaced by an essentially equivalent amount of a 0.01 M solution of $Na_2SO_4$, (2) the cetylpyridinium chloride employed to produce the mucopolysaccharide complex is added in amounts sufficient to give a concentration of this quaternary ammonium agent of 2% and (3) the mucopolysaccharide complex is dissociated by the ad-

Example 6 dition thereto of a 1 M solution of KCl rather than the 4 M solution of NaCl.

Under aseptic conditions, 500 g of cutaneous teguments of sheep foetuses between 2–5 months old, are removed. The foetuses can be of either sex. Immediately after removal, the teguments are ground, in apparatus and under the conditions described in Example 5, in the presence of 8 ml/g of an ioni extraction solution consisting of 957,5 ml of a 0.1 M solution of disodium phosphate and 42.5 ml of a 0.1 M solution of citric acid per liter.

Thereafter, there are added, per 100 ml of ground material, 50 mg of pronase having an enzymatic activity of 45 units/mg. The digestion is continued overnight at 40°C. During this operation, the sterility of the digesting medium is maintained by the addition thereto of a thymol crystal.

The resulting broth is then treated with trichloroacetic acid in amounts such that the final concentration of the acid in the broth is 10%. The broth is then centrifuged in a Jouan type C 60 TS centrifuge revolving at 4500 rpm for 30 minutes and the supernactant liquid is collected and dialyzed against running water for 18 hours.

To the resulting dialyzate there are added 2 volumes of acetone per volume of dialyzate to precipitate the mucopolysaccharides. The resulting mixture is permitted to stand for 24 hours after which it is centrifuged and the precipitate then washed, first with ethyl alcohol and then with ether, yielding 3.5 g of the active product.

The above example is repeated except that the last step of precipitation with acetone is replaced by a lyophilization operation at a temperature of about −35°C for about 8 hours.

Example 7

Under aseptic conditions 50 Kg of cutaneous teguments of sheep foetuses, between 1–6 months old, are removed. The foetuses are of either sex. Immediately after removal, the cutaneous teguments are ground dry in a Manurin H 113 apparatus. The ground material is then suspended in 50 liters of water of which the pH is adjusted to 8 by addition of NaOH. To this mixture there is added 105 g of papain having an enzymatic activity of 100 units/mg. The digestion of the proteins is continued for 20 hours at 65°C. During this phase, the sterility of the medium is maintained by the presence therein of a small crystal of thymol.

The broth, resulting from this digestion operation is then cooled to about 15°C and then filtered on gauze.

To the resulting filtrate there is then added 75 g per liter of trichloroacetic acid thereby precipitating free proteins from the filtrate mixture.

This mixture is then permitted to stand for 4 hours at about 4°C after which it is centrifuged in a Wesfalia type K 99600 apparatus revolving at about 8,000 rpm and the supernactant liquid is collected and dialyzed against running water for 24 hours and then against distilled water for 8 hours.

The resulting dialyzate is then lyophilized in a conventionnal apparatus at a temperature of about −40°C for about 24 hours, thus giving the active product in powder form.

EXAMPLES OF COSMETIC COMPOSITIONS USING THE MUCOPOLYSACCHARIDES OF THIS INVENTION

Example 8

A cosmetic lotion having the following composition is prepared:

| | |
|---|---|
| Active product prepared as described in Example 1 | 1 g |
| Perfume | 0.5 g |
| Ethyl Alcohol | 10 ml |
| Water q.s.p. | 100 ml |

Several drops of this solution were applied daily, and massaged into the scalp where it appeared more or less greasy, and the scalp rapidly regained its normal healthy condition.

Example 9

A cosmetic lotion having the following composition is prepared:

| | |
|---|---|
| Active product prepared as described in Example 7 | 1.5 g |
| Perfume | 0.7 g |
| Isopropyl Alcohol | 12 ml |
| Water q.s.p. | 100 ml |

Several drops of this solution applied daily for a period of two weeks and massaged into the scalp significantly eliminated a greasy appearance of hair and scalp.

Example 10

A cosmetic lotion having the following composition is prepared:

| | |
|---|---|
| Active product prepared as described in Example 2 | 4 g |
| Ethyl Alcohol | 15 ml |
| Water q.s.p. | 100 ml |

Several drops of this solution applied daily, or every other day, and massaged into the scalp significantly eliminates a greasy appearance of hair.

Example 11

A cosmetic composition having the following composition is prepared:

| | |
|---|---|
| Active product prepared as described in Example 3 | 2 g |
| Oleyl Alcohol oxyethylenated with 10 moles of ethylene oxide by mole of Alcohol | 4 g |
| Vitamin E | 10 mg |
| Castor oil | 2 g |
| Water q.s.p. | 100 ml |

Daily application of several drops of this composition to the scalp, when accompained by massage, is used to treat hair to essentially eliminate a greasy appearance of the hair and scalp.

Example 12

A cosmetic composition having the following composition is prepared:

| | |
|---|---|
| Choline citrate | 1 g |
| Active product prepared as described in Example 4 | 5 g |
| Water q.s.p. | 100 ml |

Daily application of several drops of this solution, massaged into the scalp, is used to treat greasy hair with results comparable to those achieved using the compositions of Examples 8–11, above.

Example 13

A cosmetic composition having the following composition is prepared:

| | |
|---|---|
| Choline citrate | 1 g |
| Allantoin | 0.5 g |
| Active product prepared as described in Example 5 | 1.5 g |
| Water q.s.p. | 100 ml |

Daily application of several drops of this solution, massaged into the scalp, effectively eliminates a greasy appearance of hair and scalp.

Example 14

A cosmetic composition having the following composition is prepared:

| | |
|---|---|
| Allantoin | 0.5 g |
| Salicylic acid | 0.5 g |
| Active product prepared as described in Example 6 | 0.5 g |
| Ethyl Alcohol | 10 ml |
| Water q.s.p. | 100 ml |

Daily application of several drops of this solution, massaged into the scalp, is effective to substantially eliminate a greasy appearance of the hair.

Example 15

A cosmetic composition having the following composition is prepared:

| | |
|---|---|
| Lactic acid | 1 g |
| Vitamin E | 10 mg |
| Polyoxyethylene (20) sorbitan monooleate (Tween 80 sold by Atlas) (d 1.06 – 1.10 - Viscosity 270–430 centistokes) | 3 g |
| Active product prepared as described in Example 4 | 3 g |
| Water q.s.p. | 100 ml |

Daily application of several drops of this solution massaged into the scalp, is effective to substantially treat greasy hair, accompanied by scalp irritation.

Example 16

A cosmetic composition having the following composition is prepared:

| | |
|---|---|
| Lactic acid | 1 g |
| Choline | 1 g |
| Active product prepared as described in Example 1 | 1.2 g |
| Water q.s.p. | 100 ml |

Daily application of several drops of this solution, massaged into the scalp, effectively eliminates a greasy appearance of the hair and scalp.

Example 17

A cosmetic composition having the following composition is prepared:

| | |
|---|---|
| Lactic acid | 1 g |
| Allantoin | 0.5 g |
| Active product prepared as described in Example 3 | 1.8 g |
| Water q.s.p. | 100 ml |

Daily application of several drops of this solution, massaged into the scalp substantially eliminates a greasy appearance of the hair and scalp.

Example 18

A cosmetic composition having the following composition is prepared:

| | |
|---|---|
| Choline | 0.50 g |
| Inositol | 0.50 g |
| Methionine | 0.50 g |
| Active product prepared as described in Example 2 | 2 g |
| Water q.s.p. | 100 ml |

Daily application of several drops of this solution, massaged into the scalp, effectively eliminates a greasy appearance of the hair and scalp.

The pH values of the solutions of Examples 8–18 are kept within the range 3.5–9

In general, the compositions of Examples 8–18 can be used daily for a period of 2–3 weeks. Treatment is then discontinued for a month, and resumed for like periods as often as necessary.

Example 19

A liquid shampoo having the following composition is prepared:

| | |
|---|---|
| Triethanolamine lauryl sulphate | 5 g |
| Lauryl diethanolamide | 2 g |
| Active product prepared as described in Example 3 | 2 g |
| Carboxymethylcellulose | 0.25 g |
| Perfume | 0.2 g |
| Water q.s.p. | 100 g |

The use of this shampoo once or twice a week accompanied by a thorough massaging of the scalp significantly reduces a greasy appearance of the hair.

Example 20

A liquid shampoo having the following composition is prepared:

| | |
|---|---|
| Sodium lauryl sulphate oxyethylenated with 2.2 moles of ethylene oxide per mole of sulphate | 5 g |
| Pure sodium monolaurylsulphossucinate | 1 g |
| Polyethylene glycol distearate | 1.5 g |
| Lauryl diethanolamide | 2.5 g |
| Active product prepared as described in Example 2 | 1.5 g |
| Perfume | 0.2 g |
| Lactic acid q.s.p. pH 6.5 | |
| Water q.s.p. | 100 g |

Example 21

A cream shampoo is prepared by mixing the following components:

| | |
|---|---|
| Sodium lauryl sulphate | 12 g |
| Condensation product of fatty acids of copra with methyltaurine, a product sold by Hoechst AG under the trade name "Hostapon C.T." | 45 g |
| Lauryl monoethanolamide | 2 g |
| Glycerine monostearate | 4 g |
| Active product prepared as described in Example 5 | 3 g |
| Lactic acid q.s.p. pH = 6.6 | |
| Perfume | 0.2 g |
| Water q.s.p. | 100 g |

EXAMPLES OF PHARMACEUTICAL
COMPOSITIONS USING THE
MUCOPOLYSACCHARIDES OF THIS INVENTION

Example 22

A solution intended to be injected into the inflammation area is prepared by mixing the contents of the following two ampoules at the time of use:

1st ampoule: 5 mg or 10 mg of Active product prepared as described in Example 1.

2nd ampoule: 5 ml of an apyrogenic sterile solvent buffered to pH 7.

The composition of this solvent is 1 g of monopotassium phosphate, 1 g of sodium bicarbonate and 9 g of sodium chloride per 1,000 ml of water.

Example 23

A cicatrising aerosol foam is prepared by mixing the following ingredients in an aerosol container:

| | |
|---|---|
| Carboxypolymethylene sold by B. F. Goodrich under the trade name of Carbopol | 25 g |
| Magnesium ethoxylaurylsulphate | 8 g |
| Glycerine | 10 g |
| Ammonia | 0.2 g |
| Active product prepared as described in Example 7 | 2 g |
| Water q.s.p. | 100 g |

88 g of the solution described above are taken and packaged under pressure in an aerosol container together with 12 g of difluorodichloromethane.

Example 24

A cream which effectively eliminates blotchiness and varicose symptoms is prepared by mixing:

| | |
|---|---|
| Active product prepared as described in Example 5 | 3 g |
| Oxyethylenated cetyl-stearyl alcohol | 7 g |
| Silicone oil | 1 g |
| Diethyleneglycol stearate | 6 g |
| Methyl para-hydroxybenzoate | 0.10 g |
| Propyl para-hydroxybenzoate | 0.10 g |
| Water q.s.p. | 100 cc |

Example 25

A penetrating gel with an anti-cellulitis action is prepared as follows:

| | |
|---|---|
| Active product prepared as described in Example 4 | 5 g |
| Perfume | 1 g |
| Carboxypolymethylene gel, pH 8, q.s.p. | 1000 g |

This gel is prepared by dissolving carboxypolymethylene sold under the trade name of "Carbopol" by B. F. Goodrich (Chem. Eng. News 36, No. 39, p 64) at the rate of 1 g per 100 ml of distilled water at 70°C until a homogeneous gel is obtained. After cooling, the gel is brought to pH 8 with an ammonia solution, whilst triturating in a mortar for good homogenization, and 2 parts per 100,000 of sodium merthiolate are added.

Unless otherwise indicated, all parts and percentages are by weight.

What is claimed is:

1. A method for producing mucopolysaccharides from a material selected from the group consisting of cutaneous teguments, umbilical cords and mixtures thereof from the foetus of an animal selected from the group consisting of a cow and a sheep comprising under aseptic conditions:
   a. grinding said material,
   b. extracting said ground material with an ionic extraction solution having a pH between 1.5 and 9 and present in amounts of about 1–20 ml/g of said ground material, said ionic extraction solution being selected from the group consisting of
      i. a 0.1–2.5 M solution of a neutral salt selected from the group consisting of sodium chloride and potassium chloride,
      ii. a 0.1 M solution of an acid salt selected from the group consisting of sodium acid phosphate, potassium acid phosphate, disodium citrate, dipotassium citrate and mixtures thereof,
      iii. a solution of hydrochloric acid having a pH of about 1.5 and
      iv. a 1N solution of sodium hydroxide,
   c. digesting said extracted, ground material in the presence of a proteolytic enzyme selected from the group consisting of trypsin, ficin, pepsin, pronase, papain and pancreatin, said enzyme being present in amounts effective to digest said material, said digesting being continued until said material becomes fluid, thereby forming a broth,
   d. adding to said broth a solvent selected from the group consisting of acetone, methanol, ethanol and isopropanol in amounts effective to precipitate said mucopolysaccharides therefrom,
   e. separating said precipitated mucopolysaccharides by filtration, decantation or centrifugation,
   f. washing said separated mucopolysaccharides, and
   g. drying said mucopolysaccharides thereby providing mucopolysaccharides in the form of a white solid, soluble in water and physiological serum solution and having a molecular weight ranging between about 5,000–2,500,000.

2. The method of claim 1 wherein grinding said material in step (a) is carried out in the presence of a solvent selected from the group consisting of acetone and ether and which includes drying said ground material prior to extracting said material in step (b).

3. The method of claim 1 wherein grinding said material in step (a) is carried out dry.

4. The method of claim 1 wherein grinding said material in step (a) is carried out in the presence of an ionic extraction solution selected from the group consisting of
   i. a 0.1–2.5 M solution of a neutral salt selected from the group consisting of sodium chloride and potassium chloride,
   ii. a 0.1 M solution of an acid salt selected from the group consisting of sodium acid phosphate, potassium acid phosphate, disodium citrate, dipotassium citrate and mixtures thereof,
   iii. a solution of hydrochloric acid having a pH of about 1.5 and
   iv. a 1N solution of sodium hydroxide.

5. The method of claim 1 wherein the sterility during steps (a), (b) and (c) is attained by the presence of effective amounts of toluene, thymol or a mixture of toluene and thymol.

6. The method of claim 1 wherein steps (b) and (c) are carried out simultaneously.

7. The method of claim 1 wherein digesting said extracted, ground material in step (c) is carried out for a period ranging between 15 and 72 hours.

8. The method of claim 1 which includes subsequent to step (c) and prior to step (d) the step of adding to said broth an acid selected from the group consisting of perchloric acid and trichloroacetic acid in amounts effective to precipitate free proteins and removing said free proteins therefrom.

9. Mucopolysaccharide made in accordance with claim 1.

10. A composition for application to the hair, scalp and skin to reduce the greasy appearance of the hair and the excessive secretion of sebum from the scalp, said composition consisting essentially of an aqueous solution of the mucopolysaccharide obtained in claim 1 and present in amounts of about 0.5–5 weight percent of said composition having a pH ranging from about 3.5–9.

11. A pharmaceutical composition to treat acute and subchronic inflammations by intramuscular injection consisting essentially of a physiological aqueous solution of the mucopolysaccharide obtained in claim 1 and present in amounts of about 0.1 to 5% by weight of said solution having a pH of about 7.

12. A pharmaceutical composition to treat acute and subchronic inflammations by oral ingestion consisting essentially of a mixture of a non-toxic ingestible carrier and the mucopolysaccharide obtained in claim 1 present in amounts of about 10 parts by weight per part by weight of said ingestible carrier.

13. The pharmaceutical composition of claim 12 wherein said non-toxic ingestible carrier is ethylcellulose and said mixture is in the form of microcapsules.

14. A method for producing a mucopolysaccharide from a material selected from the group consisting of cutaneous teguments, umbilical cords and their mixtures from the foetus of an animal selected from the group consisting of a cow and a sheep comprising under aseptic conditions
   a. grinding said material,
   b. extracting said ground material with an ionic extraction solution having a pH between 1.5 and 9 and present in amounts of about 1–20 ml/g of said ground material, said ionic extraction solution being selected from the group consisting of
      i. a 0.1–2.5 M solution of a neutral salt selected from the group consisting of sodium chloride and potassium chloride,
      ii. a 0.1 M solution of an acid salt selected from the group consisting of sodium acid phosphate, potassium acid phosphate, disodium citrate, dipotassium citrate and mixtures thereof,
      iii. a solution of hydrochloric acid having a pH of about 1.5 and
      iv. a 1N solution of sodium hydroxide,
   c. digesting said extracted, ground material in the presence of a proteolytic enzyme selected from the group consisting of trypsin, ficin, pepsin, pronase, papain and pancreatin, said enzyme being present in amounts effective to digest said material, said digesting being continued until said material becomes fluid, thereby forming a broth,
   d. adding to said broth a complexing agent selected from the group consisting of cetylpyridinium chloride and cetyltrimethylammonium bromide in amounts effective to form a complex of said mucopolysaccharides therewith thereby precipitating said mucopolysaccharide complex from said broth,
   e. adding to said precipitated mucopolysaccharide complex a 1–4 M solution of a salt selected from the group consisting of sodium chloride, potassium chloride and sodium sulfate to dissociate said mucopolysaccharide from said complexing agent,
   f. dialyzing said saline solution to produce a dialyzate consisting essentially of said mucopolysaccharides essentially free from said saline solution and said complexing agent and
   g. lyophilizing said mucopolysaccharides thereby providing a mucopolysaccharide in the form of a white solid, soluble in water and physiological serum solution and having a molecular weight ranging between about 5,000–2,500,000.

15. The method of claim 14 wherein grinding said material in step (a) is carried out in the presence of a solvent selected from the group consisting of acetone and ether and which includes drying said ground material prior to extracting said material in step (b).

16. The method of claim 14 wherein grinding said material in step (a) is carried out dry.

17. The method of claim 14 wherein grinding said material in step (a) is carried out in the presence of an ionic extraction solution selected from the group consisting of
   i. a 0.1–2.5 M solution of a neutral salt selected from the group consisting of sodium chloride and potassium chloride,
   ii. a 0.1 M solution of an acid salt selected from the group consisting of sodium acid phosphate, potassium acid phosphate, disodium citrate, dipotassium citrate and mixtures thereof,
   iii. a solution of hydrochloric acid having a pH of about 1.5 and
   iv. a 1N solution of sodium hydroxide.

18. The method of claim 14 wherein the sterility during steps (a), (b) and (c) is attained by the presence therein of effective amounts of toluene, thymol or a mixture of toluene and thymol.

19. The method of claim 14 wherein steps (b) and (c) are carried out simultaneously.

20. The method of claim 14 wherein digesting said extracted, ground material in step (c) is carried out for a period ranging between 15 and 72 hours.

21. The method of claim 14 which includes subsequent to step (c) and prior to step (d) the step of adding to said broth an acid selected from the group consisting of perchloric acid and trichloroacetic acid in amounts effective to precipitate free proteins and removing said free proteins therefrom.

22. Mucopolysaccharide made in accordance with claim 14.

23. A composition for application to the hair, scalp and skin to reduce the greasy appearance of the hair and the excessive secretion of sebum from the scalp, said composition consisting essentially of an aqueus solution of the mucopolysaccharide obtained in claim 14 and present in amounts of about 0.5–5 weight percent of said composition having a pH ranging from about 3.5–9.

24. A pharmaceutical composition to treat acute and subchronic inflammations by intramuscular injection consisting essentially of a physiological aqueous solution of the mucopolysaccharide obtained in claim 14 and present in amounts of about 0.1 to 5% by weight of said solution having a pH of about 7.

25. A pharmaceutical composition to treat acute and subchronic inflammations by oral ingestion consisting essentially of a mixture of a non-toxic ingestible carrier and the mucopolysaccharide obtained in claim 14 present in amounts of about 10 parts by weighht per part by weight of said ingestible carrier.

26. The pharmaceutical composition of claim 25 wherein said non-toxic ingestible carrier is ethylcellulose and said mixture is in the form of microcapsules.

27. A method for producing a mucopolysaccharide from a material selected from the group consisting of cutaneous teguments, umbilical cords and their mixtures from the foetus of an animal selected from the group consisting of a cow and a sheep comprising under aseptic conditions
   a. grinding said material,
   b. extracting said ground material with an ionic extraction solution having a pH between 1.5 and 9 and present in amounts of about 1–20 ml/g of said ground material, said ionic extraction solution being selected from the group consisting of
      i. a 0.1–2.5 M solution of a neutral salt selected from the group consisting of sodium chloride and potassium chloride,
      ii. a 0.1 M solution of an acid salt selected from the group consisting of sodium acid phosphate, potassium acid phosphate, disodium citrate, dipotassium citrate and mixtures thereof,
      iii. a solution of hydrochloric acid having a pH of about 1.5 and
      iv. a 1N solution of sodium hydroxide,
   c. digesting said extracted, ground material in the presence of a proteolytic enzyme selected from the group consisting of trypsin, ficin, pepsin, pronase, papain and pancreatin, said enzyme being present in amounts effective to digest said material, said digesting being continued until said material becomes fluid, thereby forming a broth,
   d. adding to said broth a protein precipitating agent selected from the group consiting of perchloric acid and trichloroacetic acid in amounts such that the concentration of the acid in the respective resulting mixture is between about 5–10 weight percent,
   e. removing the proteins from the supernactant liquid,
   f. dialyzing against water said supernactant liquid and
   g. lyophilizing the dialyzate thereby providing a mucopolysaccharide in the form of a white solid, soluble in water and physiological serum solutions and having a molecular weight ranging between about 5,000–2,500,000.

28. The method of claim 27 wherein grinding said material in step (a) is carried out in the presence of a solvent selected from the group consisting of acetone and ether and which includes drying said ground material prior to extracting said material in step (b).

29. The method of claim 27 wherein grinding said material in step (a) is carried out dry.

30. The method of claim 27 wherein grinding said material in step (a) is carried out in the presence of an ionic extraction solution selected from the group consisting of
   i. a 0.1–2.5 M solution of a neutral salt selected from the group consisting of sodium chloride and potassium chloride,
   ii. a 0.1 M solution of an acid salt selected from the group consisting of sodium acid phosphate, potassium acid phosphate, disodium citrate, dipotassium citrate and mixtures thereof,
   iii. a solution of hydrochloric acid having a pH of about 1.5 and
   iv. a 1N solution of sodium hydroxide.

31. The method of claim 27 wherein the sterility during steps (a), (b) and (c) is attained by the presence therein of effective amounts of toluene, thymol or a mixture of toluene and thymol.

32. The method of claim 27 wherein steps (b) and (c) are carried out simultaneously.

33. The method of claim 27 wherein digesting said extracted, ground material is step (c) is carried out for a period ranging between 15 and 72 hours.

34. Mucopolysaccharide made in accordance with claim 27.

35. A composition for application to the hair, scalp and skin to reduce the greasy appearance of the hair and the excessive secretion of sebum from the scalp, said composition consisting essentially of an aqueous solution of the mucopolysaccharide obtained in claim 27, and present in amounts of about 0.5–5 weight percent of said composition having a pH ranging from about 3.5–9.

36. A pharmaceutical composition to treat acute and subchronic inflammations by intramuscular injection consisting essentially of a physiological aqueous solution of the mucopolysaccharide obtained in claim 27 and present in amounts of about 0.1 to 5% by weight of said solution having a pH of about 7.

37. A pharmaceutical composition to treat acute and subchronic inflammations by oral ingestion consisting essentially of a mixture of a non-toxic ingestible carrier and the mucopolysaccharide obtained in claim 27 present in amounts of about 10 parts by weight per part by weight of said ingestible carrier.

38. The pharmaceutical composition of claim 37 wherein said non-toxic ingestible carrier is ethylcellulose and said mixture is in the form of microcapsules.

* * * * *

UNITED STATES PATENT OFFICE
CERTIFICATE OF CORRECTION

Patent No. 3,887,703  Dated June 3, 1975

Inventor(s) Georges Manoussos and Claudine Berrebi

It is certified that error appears in the above-identified patent and that said Letters Patent are hereby corrected as shown below:

In the Heading

Under [30] Foreign Application Priority Data add the following: --March 24, 1967 Luxembourg 53280--

Signed and Sealed this tenth Day of February 1976

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

PATENT NO. : 3,887,703
DATED : June 3, 1975
INVENTOR(S) : Georges MANOUSSOS ET AL It is certified that error appears in the above-identified patent and that said Letters Patent are hereby corrected as shown below:

IN THE HEADING:

Under [30] Foreign Application Priority Data, change "September 28, 1968" to --September 23, 1968--.

Signed and Sealed this eighth Day of June 1976

[SEAL]

Attest:

RUTH C. MASON
Attesting Officer

C. MARSHALL DANN
Commissioner of Patents and Trademarks